United States Patent
Mao

(10) Patent No.: US 8,453,504 B1
(45) Date of Patent: Jun. 4, 2013

(54) ANGULAR RATE SENSOR WITH SUPPRESSED LINEAR ACCELERATION RESPONSE

(76) Inventor: Minyao Mao, Santa Rosa, CA (US)

( * ) Notice: Subject to any disclaimer, the term of this patent is extended or adjusted under 35 U.S.C. 154(b) by 440 days.

(21) Appl. No.: 12/692,606

(22) Filed: Jan. 23, 2010

(51) Int. Cl.
*G01C 19/00* (2006.01)
*G01P 3/44* (2006.01)

(52) U.S. Cl.
USPC .................................................. 73/504.14

(58) Field of Classification Search
USPC .................................................. 73/504.14
See application file for complete search history.

(56) References Cited

U.S. PATENT DOCUMENTS

| | | | |
|---|---|---|---|
| 5,635,638 A | 6/1997 | Geen | |
| 5,895,850 A | 4/1999 | Buestgens | |
| 6,877,374 B2 | 4/2005 | Geen | |
| 6,946,742 B2 * | 9/2005 | Karpman | 257/778 |
| 7,036,372 B2 | 5/2006 | Chojnacki et al. | |
| 2006/0150745 A1 * | 7/2006 | Lang | 73/849 |
| 2006/0272410 A1 * | 12/2006 | Mao et al. | 73/504.02 |

* cited by examiner

*Primary Examiner* — Hezron E Williams
*Assistant Examiner* — Gregory J Redmann

(57) ABSTRACT

An angular rate sensor having two generally planar proof masses, a drive axis in the plane of the masses, and an input axis perpendicular to the drive axis. The masses are suspended from a sensing frame and constrained for anti-phase movement along the drive axis in drive-mode. The sensing frame is mounted for torsional movement in sense-mode about the input axis in response to Coriolis forces produced by rotation of the masses about the input axis, with sensors responsive to the torsional movement of the sensing frame and the masses about the input axis for monitoring rate of rotation.

8 Claims, 18 Drawing Sheets

ANGULAR RATE SENSOR WITH SUPPRESSED LINEAR ACCELERATION RESPONSE

BACKGROUND OF THE INVENTION

1. Field of Invention

This invention pertains generally to micromachined angular rate sensors or gyroscopes, and more particularly to vibratory rate sensors utilizing dual-mass anti-phase translational movement in drive or sense modes.

2. Related Art

Many applications in automotive and consumer market require rate sensors to be insensitive to linear acceleration in all directions. In general, a rate sensor can be susceptible to linear acceleration in the drive and sense directions of the proof masses of the sensor.

For rate sensors utilizing translational drive motion, commonly used dual-mass approach with conventional coupling method, such as that disclosed in U.S. Pat. No. 5,895,850, has an in-phase linear vibration mode with resonant frequency below that of the anti-phase drive-mode. This parasitic mode allows the centroid of the proof masses to move in response to linear acceleration along the drive axis, so that the velocities of the masses are susceptible to linear acceleration in the drive direction. To reduce this susceptibility, the in-phase mode must be well suppressed such that its resonant frequency is much higher than that of anti-phase drive-mode.

Geen disclosed a mechanical coupling method in U.S. Pat. No. 5,635,638, which allows anti-phase linear movement of the two-coupled masses but resists their in-phase movement. However, the in-phase mode cannot be well suppressed due to the fact that the arcuate coupling member used is prone to bending and buckling under linear acceleration forces in the drive direction. Furthermore, no actual gyroscope device utilizing that coupling method has been disclosed.

Geen disclosed a different mechanical coupling method in U.S. Pat. No. 6,877,374 in a Z-axis gyroscope that leads to a better suppression of in-phase translational movement of the proof masses. However, this coupling structure is complex which includes multiple levers, pivots, and flexures, and each proof mass has to split into two parts that move in arcuate motion, instead of pure linear movement. The unbalanced arcuate motion of the two parts of a proof mass due to the process imperfections results in an undesired net movement of the masse in sense direction, which causes the error of the sensor.

U.S. Pat. No. 7,036,372 discloses a Z-axis gyroscope that utilizes a mechanical linkage between two masses which resists in-phase movement. Again, that linkage is complicated with requirement of multiple stiff rotation beams with inner anchor points as pivots that occupy a considerable layout area. Furthermore, the linkage must include pivots anchored to the substrate. That makes it impossible to mount the linkage on movable structure, which is often desirable in multi-axes rate sensors.

For many vibratory dual-mass gyroscopes, the rejection of linear acceleration in sense direction, which is perpendicular to drive axis, is achieved by differential processing of the electrical signals from the sense responses of the two masses. The spurious sense signals caused by linear acceleration noise can only be cancelled when the two masses and their resonant frequencies of sense modes are identical, which are impractical due to the process imperfections. And the un-cancelled residual signal becomes the error and noise in the rate signal.

OBJECTS AND SUMMARY OF THE INVENTION

It is in general an object of the invention to provide a new and improved angular rate sensor or gyroscope.

Another object of the invention is to provide a rate sensor or gyroscope of the above character, which overcomes the limitations, and disadvantages of rate sensors of the prior art.

These and other objects are achieved in accordance with the invention by providing an angular rate sensor having two generally planar proof masses, a drive axis in the plane of the masses, an input axis perpendicular to the drive axis, a planar sensing frame in the plane of the masses, means for suspending the masses from the sensing frame for movement along the drive axis, means for coupling and constraining the masses for anti-phase drive-mode oscillation along the drive axis, means for driving the masses to oscillate in drive-mode, means for mounting the sensing frame for rotation about the input axis in response to Coriolis forces produced by rotation of the masses about the input axis, means responsive to the rotational movement of the sensing frame and the masses for monitoring rate of rotation.

BRIEF DESCRIPTION OF THE DRAWINGS

FIG. 2($b$) is an operational view, illustrating the in-phase mode movement of the embodiment of FIG. 1.

DETAILED DESCRIPTION

Figure 1:
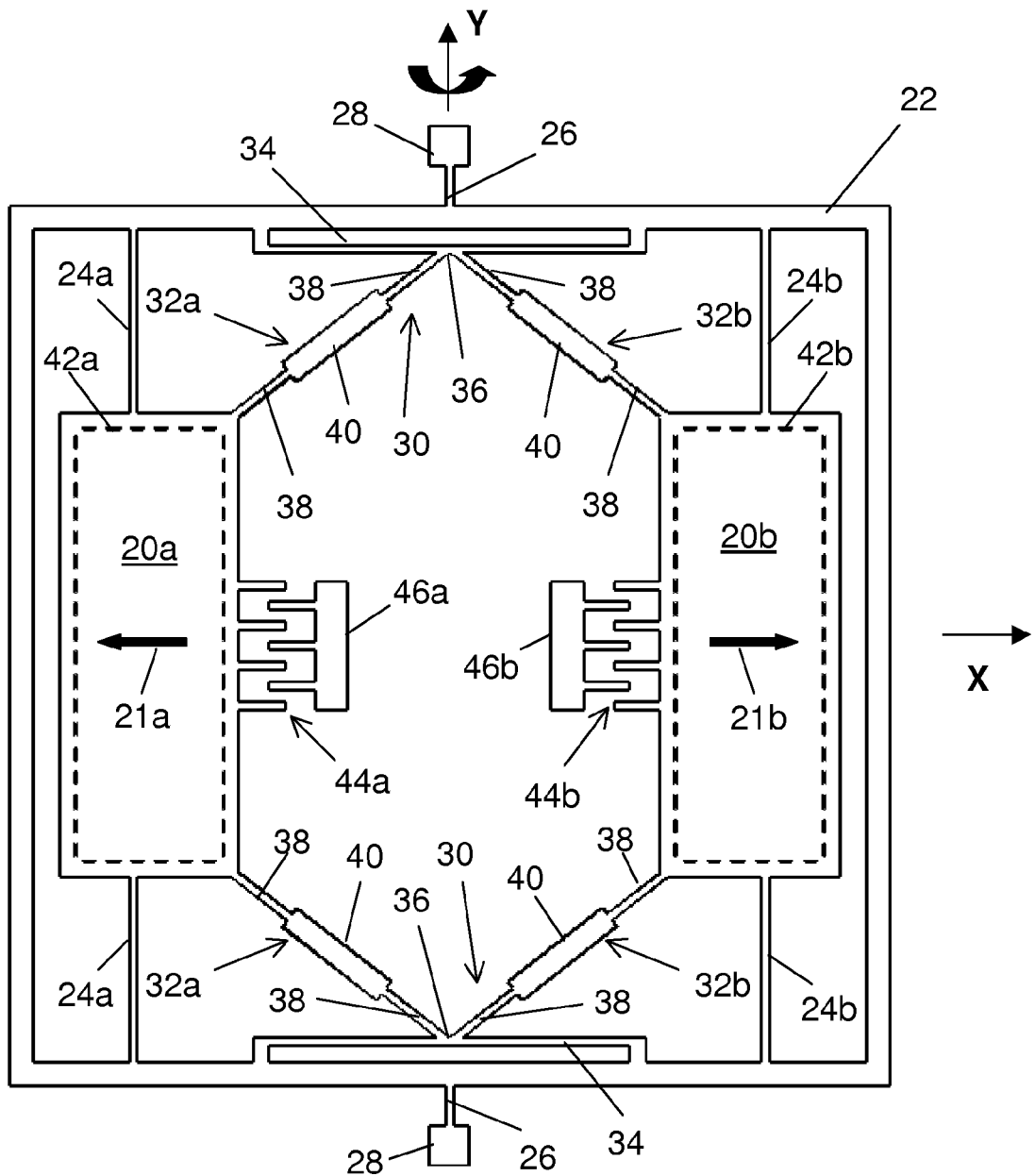
FIG. 1 is a top plan view of an embodiment of a y-axis rate sensor according to the present invention.

As illustrated in FIG. 1, the rate sensor has a pair of generally planar proof masses 20a, 20b that lie in an x, y reference plane when the device is at rest. The masses are disposed and spaced apart along the x-axis, which is the drive axis, i.e. the axis along which the masses are driven to oscillate in drive-mode. The input axis, i.e. the axis about which the angular rate of rotation is measured, is the y-axis.

The proof masses are suspended from a supporting frame, or sensing frame, 22 in the plane of the masses by flexible beams, or flexures, 24a, 24b. The flexures, which extend along the y-axis, are relatively flexible in the drive direction, but relatively stiff in other directions. These flexures constrain each one of the masses for linear movement along the x-axis.

The masses can be driven into oscillation along the drive axis by comb drives 44a, 44b, which have interdigitated comb fingers with moveable fingers attached to masses 20a, 20b and stationary fingers affixed to the anchored electrodes 46a, 46b respectively.

The sensing frame is generally planner and disposed in the x, y plane with and surrounding the masses. It is suspended from substrate (not shown) by a pair of torsion springs 26, which are spaced apart and extend along the y-axis and connect to anchors 28 affixed to the substrate. These torsion springs constrain the sensing frame for rotation about the y-axis in response to the Coriolis forces produced by the rotation of the masses about the input axis, i.e. the y-axis, when the masses are driven to oscillate in anti-phase manner along the x-axis, as indicated by the arrows 21a, 21b.

The torsion movement of the sensing frame and the masses about the y-axis in sense-mode is detected capacitively by a pair of capacitors formed between masses 20a, 20b and corresponding electrode plates 42a, 42b, which are mounted under the masses respectively on the substrate. These capacitors work together to serve as a differential sensor, or detector, for monitoring the rate of rotation about the y-axis.

A pair of mechanical linkages, or anti-phase couplers, 30, which are mounted on the sensing frame and connected between the masses, couple the masses together and constrain them for precise anti-phase movement in drive-mode. The two couplers are spaced apart along the y-axis and disposed symmetrically about the x-axis.

Each anti-phase coupler includes a supporting beam 34 and a pair of link springs 32a, 32b. The supporting beam extends along the x-axis and is affixed to the sensing frame at its two ends. The link springs extend from respective masses to the supporting beam. They are tilted slightly from the y-axis and disposed symmetrically about that axis. The two link springs join together at the midpoint of the supporting beam forming a common joint 36.

Each link spring of the anti-phase couplers consists of a relatively long, stiff stem 40 and a pair of short flexible beams, or hinges, 38 connected to the two ends of the stem. The flexible beams are orientated substantially along the longitudinal direction of the stem. Under this arrangement, a link spring can be approximated as a rigid bar with rotation hinges attached to its both ends so that it is stiff in its longitudinal direction while permitting rotation about the z-axis, which is perpendicular to the x, y reference plane.

Figure 2A:
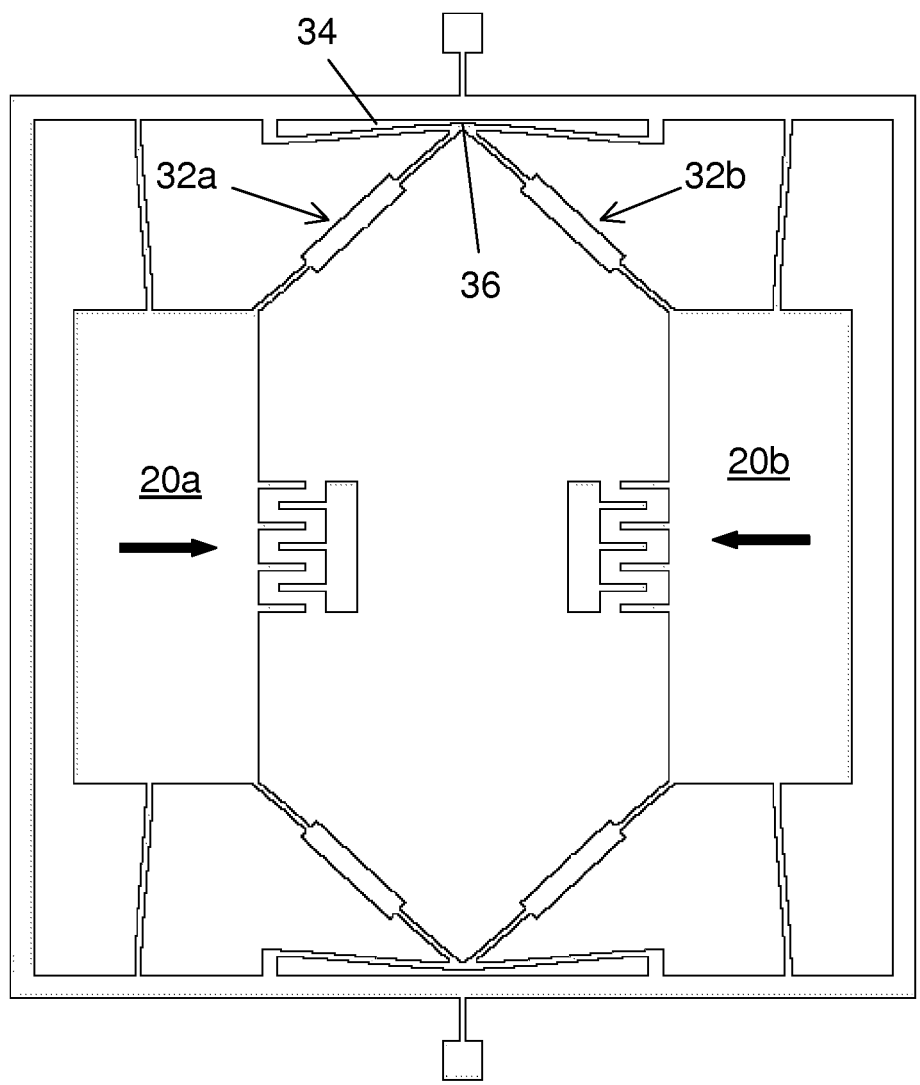
FIG. 2($a$) is an operational view, illustrating the anti-phase drive-mode movement of the embodiment of FIG. 1.

In operation, the link springs transfer the drive-mode movement of masses along the x-axis to joints 36, which are constrained for linear movement along the y-axis by supporting beams 34. When the two masses move in an anti-phase manner, as illustrated in FIG. 2(a), two link springs in each anti-phase coupler tend to move their joint in same direction along the y-axis and cause the supporting beam to bend. Since the supporting beam is flexible in that direction, the anti-phase movement of the masses experiences minimal resistance from the anti-phase coupler. With symmetric design about the y-axis, the two masses have equal amplitudes in drive-mode oscillation, and the phase difference between the masses is precisely 180 degrees, which is guaranteed by the geometry of the anti-phase coupler and tolerant to fabrication process imperfections.

Figure 2B:
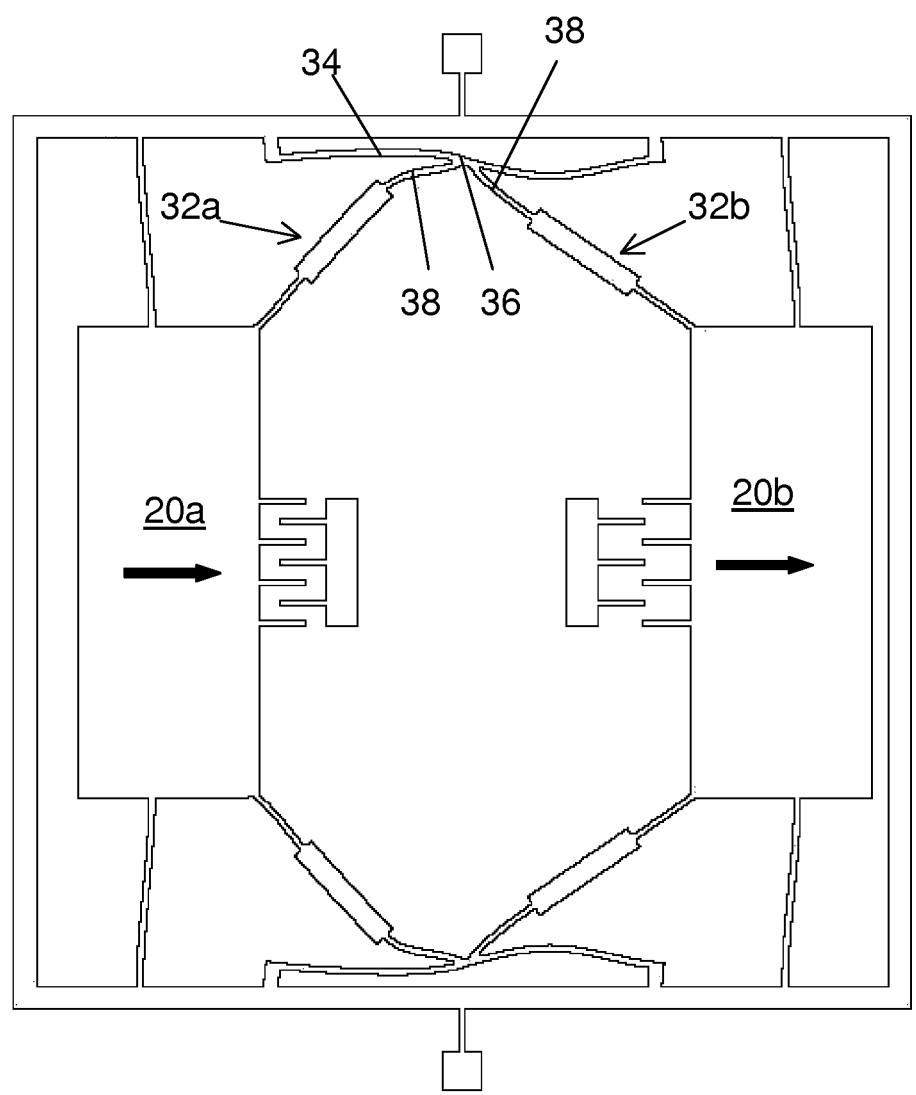

When the two masses try to move in in-phase manner, as illustrated in FIG. 2(b), two link springs in each anti-phase coupler tend to cause their joint to move in opposite direction along the y-axis and to cancel each other ideally, which actually results in suppression of the in-phase movement. However, in a real device, the constraints of joints from supporting beams are not ideal. As also shown in FIG. 2(b), joints 36 can still have, to some extent, some undesired translational and rotational freedoms caused by the asymmetric bending of supporting beam 34 and bending or buckling of hinges 38, which leads to overall deformation of the link springs in their longitudinal directions. As a result, the in-phase mode of the two masses is not suppressed completely. However, the resonant frequency of the in-phase mode in a typical design is still significantly higher than that of the antiphase mode, which is the working mode of the rate sensor in operation.

With fixed working mode frequency, maximizing the in-phase mode resonant frequency in a dual-mass gyroscope is important to improve its performance of linear vibration noise rejection. In general, the larger the tilt angle of link spring the higher efficiency in transferring the longitudinal movement of the masses along the x-axis into lateral motions along the y-axis at joints 36, which result in stronger coupling effect of the anti-phase couplers. However, to accommodate larger motion at the joints, supporting beams 34 have to be softer in order to keep the anti-phase mode frequency constant. The softer supporting beams result in weaker constraint of joints in undesired freedoms, such as the translation along the x-axis and the rotation about the z-axis, which actually cause weaker in-phase mode. Therefore, there is a tradeoff in maximizing the in-phase mode frequency, which depends on detailed design of the gyroscope.

To maximize the in-phase mode frequency under fixed tilt angle of link springs, it is important to increase the longitudinal stiffness of the link springs. Lower longitudinal stiffness results in lower efficiency in transferring the movement of the masses in the x-direction to the motion of the joints in the y-direction. In the worst case, a link spring can undergo buckling, which leads to zero transferring efficiency and no coupling effect between the masses at all. Compared to a simple straight beam, a link spring with a stiff stem in the middle can have significantly increased longitudinal stiffness and buckling threshold that leads to much higher efficiency in motion transferring.

It is also important to increase the overall linear stiffness of the link springs along the drive direction so to reduce their deformation under linear acceleration along the x-axis. In general, the longer and stiffer stems 40, and shorter hinge beams 38 lead to more rigid in-phase mode. However, the shorter hinge beam requires smaller width to keep it flexible enough to serve as a rotation hinge, which increases the process sensitivity of its spring constant.

In a typical design, with a hinge length of $1/3$-$1/2$ of that of stem and tilt angle of 10-30 degrees from the y-axis, the in-phase mode frequency can be pushed to 3-5 times of that of anti-phase drive-mode, which greatly suppresses the displacement of the masses in response to linear acceleration along the drive axis.

Figure 3:
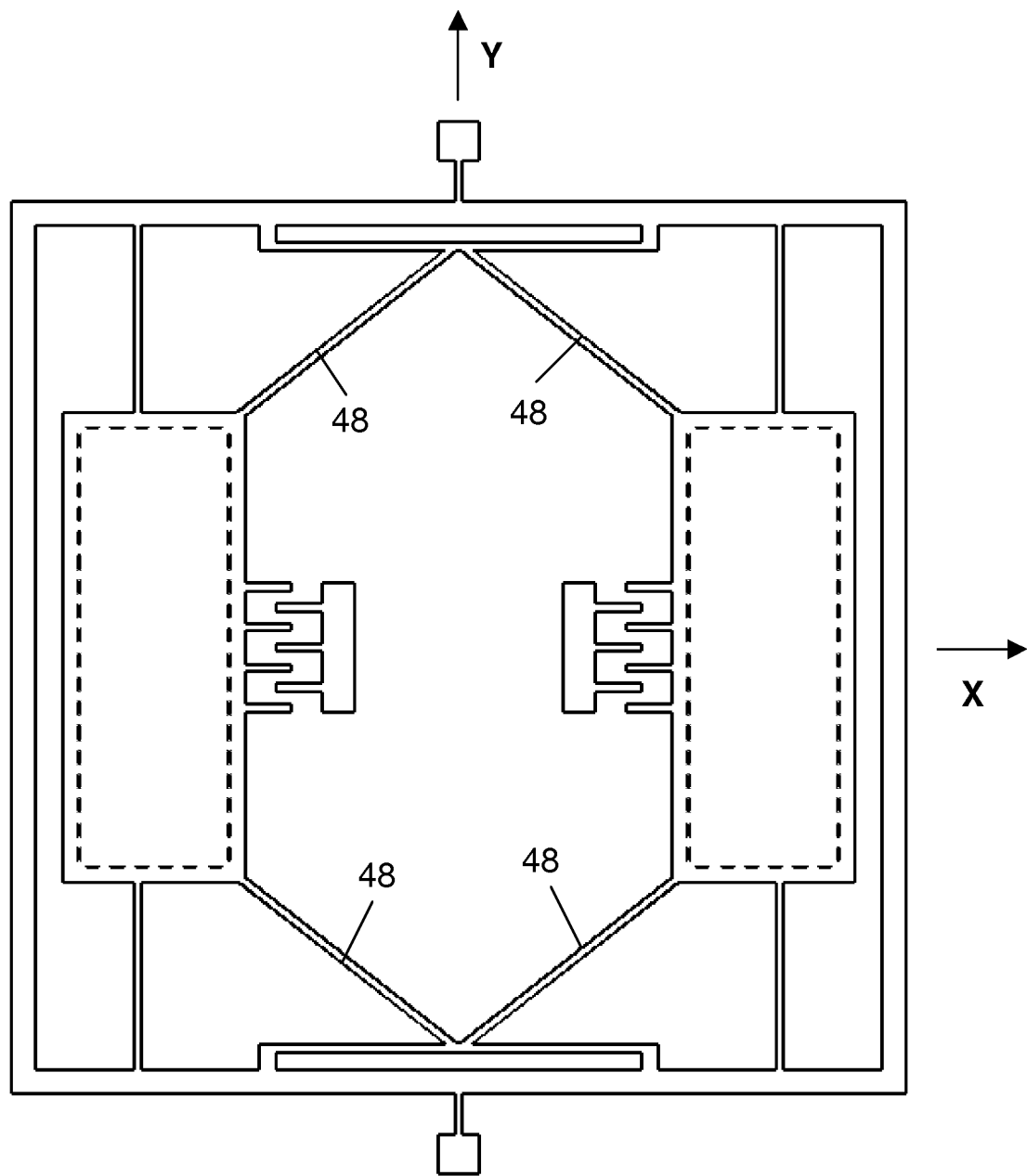
FIG. 3 is a top plan view of another embodiment of a y-axis rate sensor according to the present invention.

It should also be noted that the anti-phase coupler structure described above could lead to the best performance in suppressing the in-phase mode. FIG. 3 shows another embodiment of a y-axis rate sensor which is very similar to the embodiment shown in FIG. 1, except it uses straight beams 48 as link springs. This link spring design can be viewed as a special case of that of the embodiment shown in FIG. 1, if the width of stems 40 in that embodiment is reduced to the same as that of hinge beams 38. With proper design optimization of the tilt angle and dimensions of related beams, fairy good in-phase mode suppression may also be achieved.

One should note that the anti-phase coupling design disclosed in the present invention has a significant improvement over the prior art, such as disclosed in U.S. Pat. No. 5,635,638, wherein the coupling member, which is equivalent to link spring of the present invention, is an arcuate member. Due to its curved shape that is prone to buckling and bending in multiple directions, the arcuate member can only be viewed as a poor link spring with significantly lower stiffness in longitudinal direction and overall linear stiffness along the drive axis than that of link springs disclosed in the present invention. Therefore, it results in much lower efficiency in motion transferring and more displacement under linear acceleration, which lead to lower efficiency in anti-phase coupling and in-phase suppression.

Figure 4:
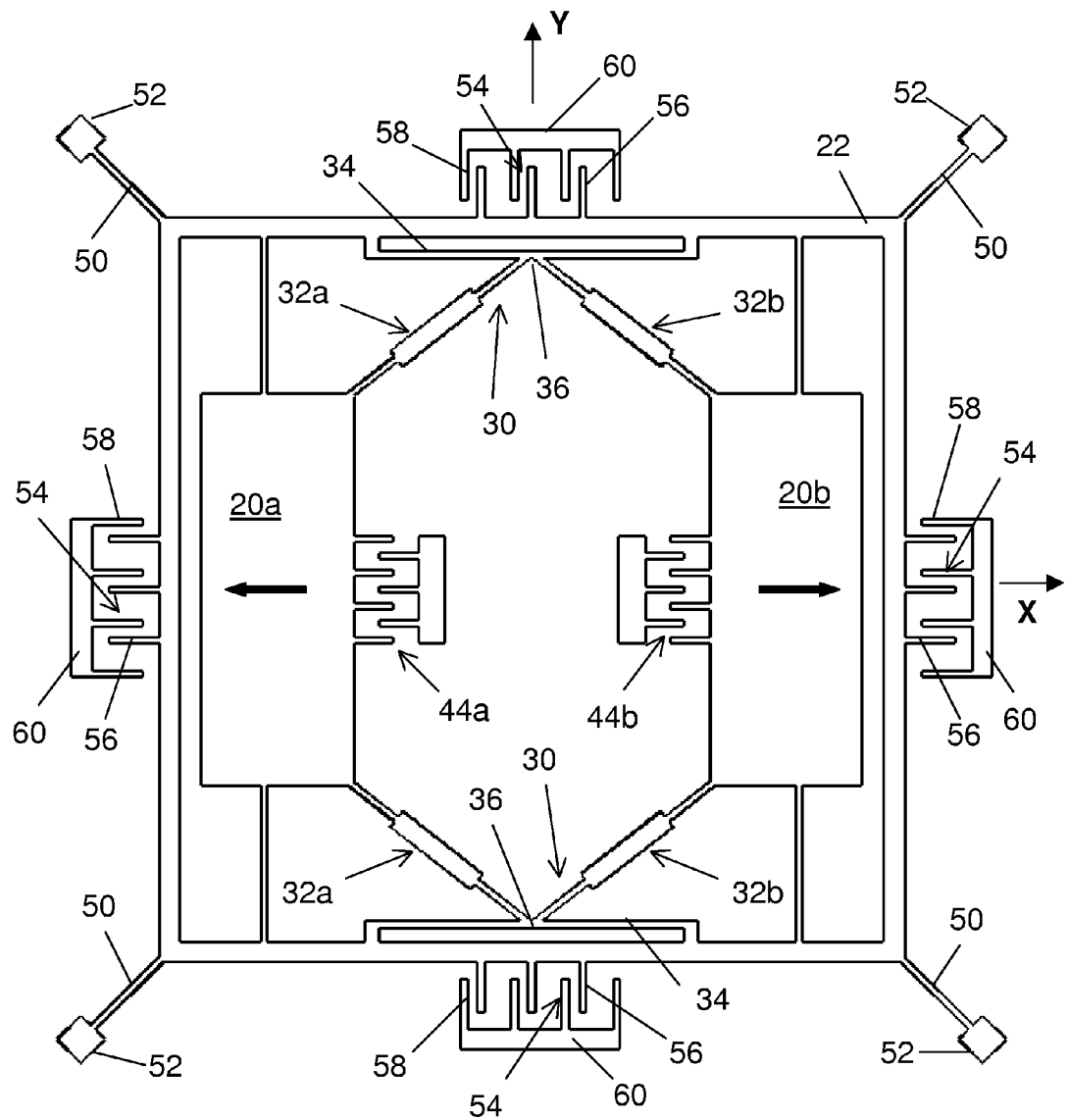
FIG. 4 is a top plan view of an embodiment of a z-axis rate sensor according to the present invention.

FIG. 4 shows an embodiment of a z-axis rate sensor using similar anti-phase coupled dual-mass drive as that in the embodiment of a y-axis rate sensor shown in FIG. 1. Since very similar masses and coupling designs are used, they are assigned same numbers as that in the previous embodiment. Again, masses 20a, 20b are suspended from sensing frame 22, and linked by anti-phase couplers 30, which consist of link springs 32a, 32b and supporting beams 34, for anti-phase drive-mode oscillation along the x-axis.

However, the sensing frame in this embodiment is suspended by four flexures 50 disposed at the corners of the rectangular frame and connected to anchors 52. Each flexure is generally stiff in longitudinal direction but compliant in its lateral direction in the plane of the masses. The flexures are preferably oriented along radial directions that permit the sensing frame to rotate about the z-axis but resist other movements.

In operation, the masses are driven electrostatically by combs 44a, 44b to oscillate in anti-phase manner along the x-direction. The rotation of masses about the input axis, which is the z-axis, produces Coriolis forces that cause the masses and the sensing frame to rotate about the z-axis. This sense-mode rotation of the sensing frame about the z-axis is monitored by capacitors 54 which have interleaved parallel plates 56, 58 connected to the sensing frame and to anchors 60 respectively.

The rate sensor of this embodiment has longitudinal comb drives 44a, 44b oriented along the drive axis with movable fingers directly attached to the proof masses for driving the masses to oscillate in drive-mode. One troublesome side effect of this straightforward drive approach is that small imbalances of the gaps between the fingers induce a lateral motion in addition to the longitudinal drive-mode oscillation along the x-axis. The imbalances of the gaps of fingers can be caused by process imperfections, stress, or external acceleration, etc, which are difficult to eliminate completely.

This lateral motion caused by the gap imbalance has a component that is in-phase with the motion caused by the Coriolis forces. Unlike quadrature signal, it cannot be separated and rejected from the real rate signal by phase sensitive circuitry. Furthermore, any instability of this in-phase signal directly contributes to the noise and error of the output of the rate sensor.

Figure 5:
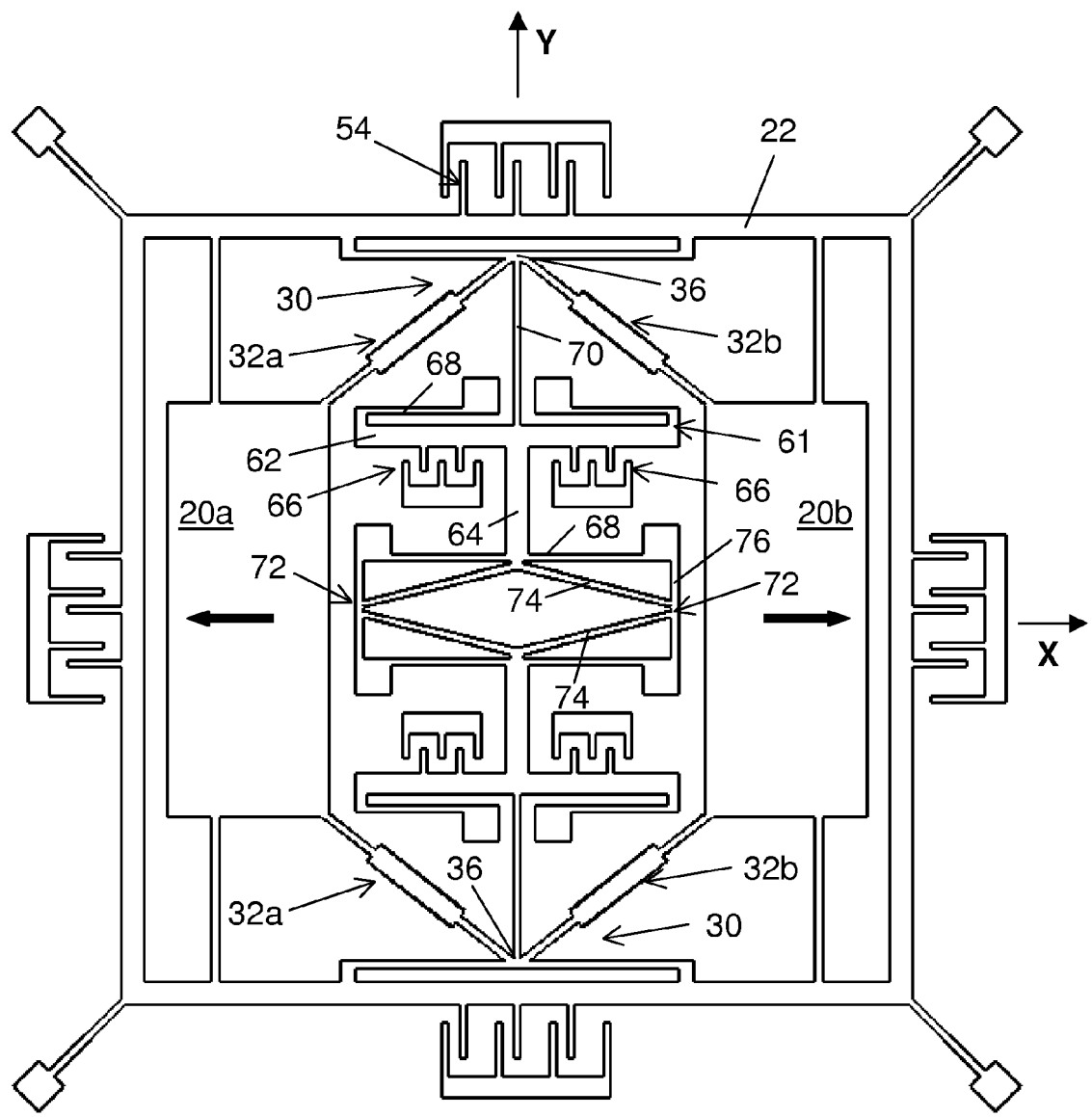
FIG. 5 is a top plan view of another embodiment of a z-axis rate sensor according to the present invention.

This problem is solved in the present invention by using a decoupled comb drive system in which the drive motion of the comb fingers is perpendicular to the drive axis of the sensor and decoupled from the sense-mode movement. This drive design is used in another embodiment of a z-axis rate sensor, as shown in FIG. 5.

This embodiment is generally similar to the embodiment of FIG. 4, except it uses a new drive system to replace the comb drives 44a, 44b of FIG. 4. The drive system is disposed in the center area surrounded by masses 20a, 20b and anti-phase couplers 30. The drive system consists of two identical sub drive systems that are disposed along the y-axis and are symmetrical about the x-axis.

Each sub drive system is generally symmetric about the y-axis. It includes a T-shape rigid driving frame 61, which consists of an arm 62 extending along the x-direction and arm 64 extending along the y-axis, and comb drives 66 with moving fingers affixed to arm 62 and stationary fingers anchored to the substrate. The driving frame is suspended by suspension flexures 68 which extend along the x-axis and connect to anchors. These flexures permit the driving frame to move along the y-axis and severely resist movement in all other directions. The comb drives are oriented with fingers parallel to the y-axis for exciting the driving frames to oscillate along the y-axis in drive-mode.

Each driving frame 61 is connected to respective joint 36 by a link flexure 70, which extends along the y-axis. The link flexure is relatively stiff in its longitudinal direction, but relatively compliant in its lateral direction for bending in the plane of the masses.

In operation, comb drives 66 electrostatically excite each frame 61 to move in the y-direction. This motion is linked and transferred by link flexure 70 to joint 36, and further transferred through link springs 32a, 32b to move the masses along the x-axis. Since the two sub drive systems are disposed symmetrically about the x-axis, the same drive signal applied on all combs 66 causes two joints 36 of the sensor to move in opposite directions along the y-axis. Thus, the two link springs connected to each mass tend to move the mass in same direction. Again, as in the previous embodiments, the anti-phase couplers 30 connected to the masses ensure the two masses to oscillate in precise anti-phase manner with equal amplitudes.

When the rate sensor rotates about its input axis, which is the z-axis, Coriolis forces produced by this rotation and the velocities of the masses of drive-mode oscillation cause the masses and the sensing frame to rotate about the z-axis. Such sense-mode movement experiences little resistance from link flexures 70, because they are compliant in lateral directions.

In this embodiment, the erroneous output of the sensor induced by the lateral motion of drive fingers caused by imbalances of the gaps of the fingers is greatly suppressed. First, the lateral movement of drive fingers result from the same gap imbalances is significantly reduced, because driving frames 61 are now severely resistant to movement in the lateral direction by the suspension flexures 68 which extend along that direction. Second, link flexures 70 are compliant in this lateral direction so that the lateral motion transferred to the sensing frame is further reduced.

Another advantage of this drive design is that the amplitude of masses in drive-mode oscillation can be different from that of comb drives 66, and can be tuned by adjusting the tilt angle of the link springs. This allows one to design a sensor with large drive amplitude of the masses but relative short fingers of comb drives. This results in more efficient drive and smaller device. Also interesting is the opposite case, where the travel distance of comb is larger than the drive amplitude of the masses in drive-mode. The larger travel distance of the combs can put in more electrostatic energy to the system in each drive cycle, thus the drive voltage can be reduced in order to drive the masses into the same amplitude. This is particularly desirable for gyroscopes operating in atmosphere or poor vacuum environment with low Q (quality factor) that usually require high drive voltages.

As shown in FIG. 5, the two sub drive systems can be further coupled together by another pair of anti-phase couplers 72 which are disposed along the x-axis and symmetric about the y-axis. Each coupler is also symmetric about the x-axis. The design of anti-phase coupler 72 is similar to that of anti-phase coupler 30, each includes a pair of link springs 74 and a supporting beam 76. The two link springs in each anti-phase coupler 72 are tilted slightly from the x-axis and connected respectively to the ends of rigid arms 64. And the supporting beams which extend along the y-axis are connected to the anchors affixed to the substrate.

Anti-phase couplers 72 further suppress the in-phase movement of the two sub drive systems, and ensure precise anti-phase and equal amplitudes of the two sub drive systems in drive-mode. That makes the drive system immune to the external acceleration along the y-axis.

For simplicity, each link spring 74 in anti-phase couplers 72 is drawn as a simple straight beam. Certainly, more complicated shape similar to that of 32a in anti-phase coupler 30 can be used for better performance.

Figure 6:
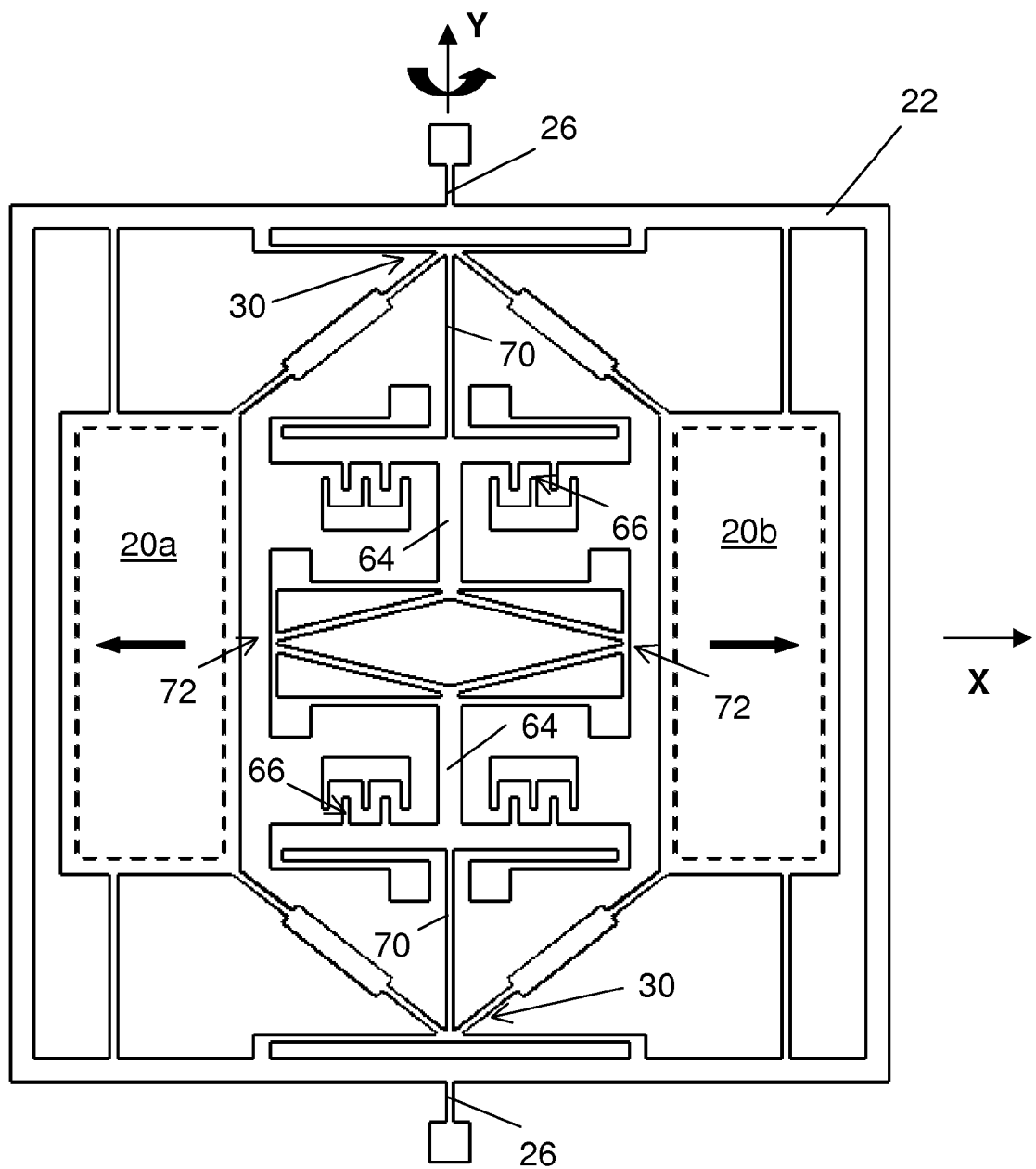
FIG. 6 is a top plan view of another embodiment of a y-axis rate sensor according to the present invention.

This decoupled drive approach can also be applied to y-axis rate sensors. FIG. 6 illustrates another embodiment of a y-axis gyroscope, which is generally similar to the embodiment of FIG. 1 but employs the same decoupled drive system shown in the embodiment of FIG. 5.

In this embodiment, the sense-mode motion in response to Coriolis forces produced by rate of rotation about the y-axis is the rotation of sensing frame 22 and masses 20a, 20b about the y-axis. It should be noted that, link flexures 70 which extend along the y-axis also permit rotation about the y-axis. Therefore, they impose little resistance to the sense-mode movement, and decouple the sense motion from the drive system.

Figure 7:
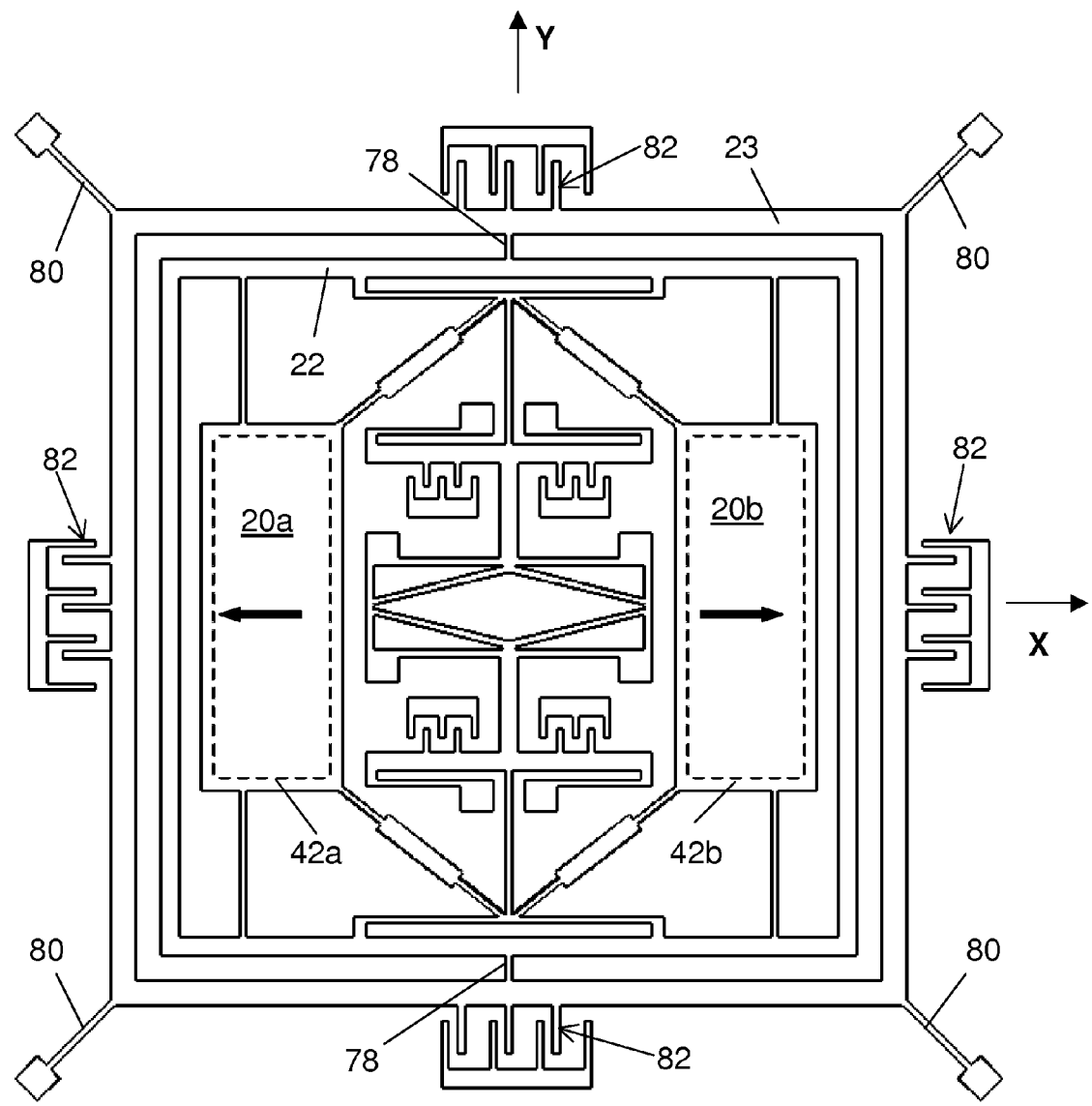
FIG. 7 is a top plan view of an embodiment of a dual-axis rate sensor according to the present invention for detecting rate of rotation about the y-, and z-axes.

FIG. 7 shows an embodiment of a dual-axis rate sensor for detecting rate of rotation about the y-, and z-axes. It has similar drive and coupling structures as that shown in the embodiments of FIG. 5 and FIG. 6, but different sense structure. In addition to sensing frame 22, it has another sensing frame 23, which surrounds 22. And frame 22 is suspended from 23 by torsion springs 78 for rotation relative to 23 about the y-axis. Frame 23 is suspended from the substrate by a set of flexures 80 for rotation about the z-axis.

In operation, masses 20a, 20b are driven to oscillate in anti-phase manner along the x-axis, which is similar to that described in the embodiment of FIG. 5. The rate of rotation about the y-axis produces Coriolis forces that cause the masses and frame 22 to rotate about the y-axis. This sense mode rotation is sensed capacitively for monitoring rate of rotation by two electrode plates 42a, 42b mounted beneath the two masses respectively.

In the mean time, the rate of rotation about the z-axis produces Coriolis forces that cause the masses and frames 22, 23 to rotate together about the z-axis. And this sense-mode rotation is detected for monitoring rate of rotation by parallel-plate capacitors 82, which have interleaved plates with moveable ones mounted on frame 23 and stationary ones affixed to electrodes anchored on the substrate.

In a typical gyroscope design with comparable resonant frequencies of the two sense modes, i.e. rotations about the y-, and z-axis, torsion springs 78 are often much shorter and substantially stiffer for bending in the plane than that of flexures 80. Therefore, frames 22 and 23 rotate together with little difference in amplitudes in the sense mode of rotation about the z-axis.

Under this design of sense structure, the two sense-mode rotations are well decoupled from one another, the dual-axis rate sensor monitors two components (y-, and z-) of an angular velocity simultaneously with little interference, or crosstalk from one another. Therefore, with two such dual-axis sensors rotated 90 degrees about the z-axis from one another in same substrate or same package, all three components (x-, y-, and z-) of an angular velocity can be determined simultaneously. This is one way of making a tri-axis rate sensor, which is more efficient and can have smaller size than conventional approach that assembles three single-axis gyroscopes together.

Figure 8:
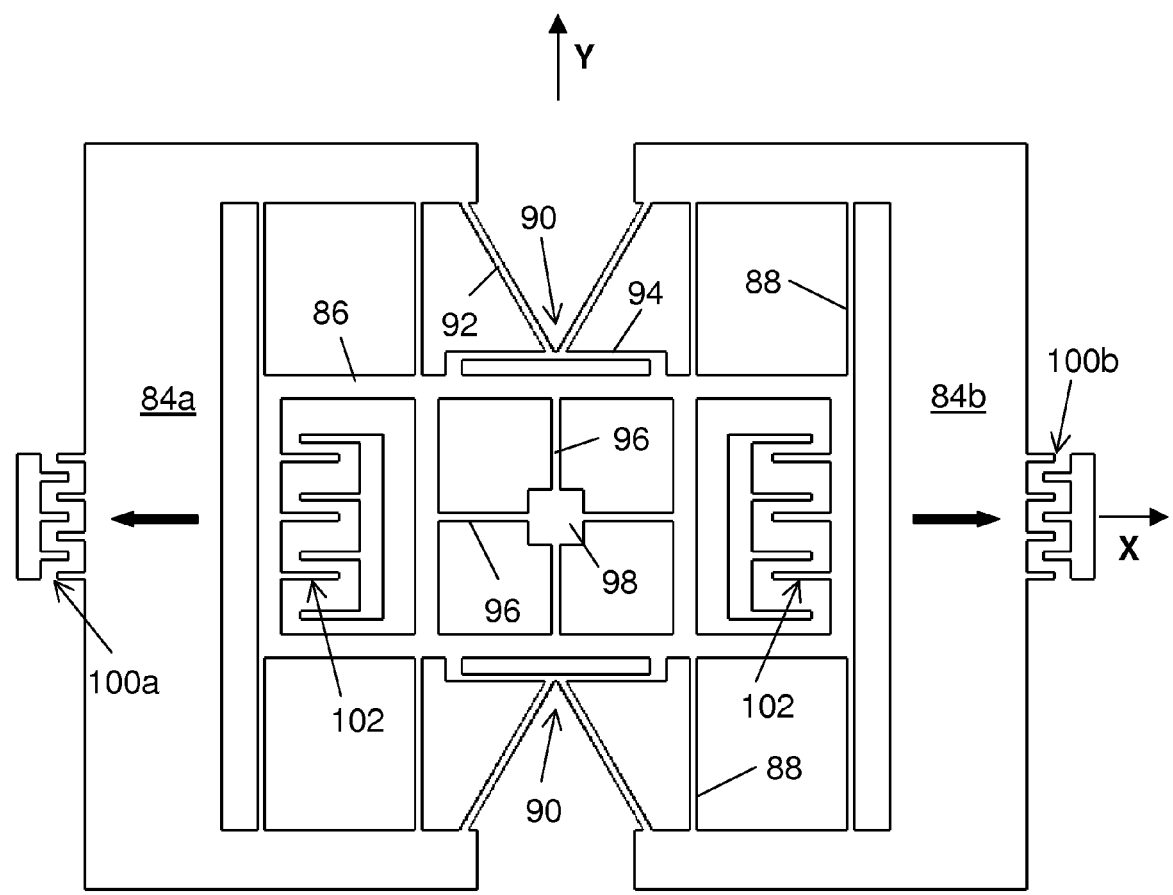
FIG. 8 is a top plan view of another embodiment of a z-axis rate sensor according to the present invention.

All embodiments of rate sensors described above have sensing frames disposed outside and surrounding the masses. This approach requires relatively larger frame structures that occupy more layout areas. FIG. 8 shows another embodiment of a z-axis rate sensor that has a sensing frame surrounded by the masses.

As illustrated in FIG. 8, the rate sensor of this embodiment is essentially symmetric about the x-, and y-axes. Two horse-shoe shaped masses 84a, 84b are disposed side-by-side along the x-axis with the openings of cutout areas facing each other. The masses are suspended from a sensing frame 86, which is disposed in the center area enclosed by the two masses, by suspension flexures 88 extending along the y-axis. The two masses are coupled by a pair of anti-phase couplers 90, each of which consists of a pair of link springs 92 and a supporting beam 94 which is mounted to the sensing frame. Link springs 92 are tilted slightly from the y-direction, and supporting beams 94 extend along the x-axis. The anti-phase couplers ensure the two masses to move in anti-phase manner along the x-axis in drive-mode. Sensing frame 86 is suspended by a set of sense flexures 96 disposed along radial directions that permit the frame to rotate about the z-axis and severely resist other movement. These flexures are mounted to the substrate by anchor 98 located at the center of the sensor.

In operation, masses 84a, 84b are driven electrostatically to oscillate along the x-axis in an anti-phase manner by comb drivers 100a, 100b respectively. The input rate of rotation about the z-axis produces Coriolis forces that cause the masses and the sensing frame to rotate about the z-axis. This sense-mode rotation is monitored for measuring rate of rotation by parallel-plate capacitors 102 that have interleaved plates mounted to the sensing frame and to anchored eletrodes.

This embodiment has generally smaller sensing frame, or smaller moment of inertia of sense mode compared to that in the previous embodiments with sensing frames surrounding the masses. Since the sensing frame is a passive part of the device that serves as a load mass to Coriolis forces, the smaller moment of inertia of the frame leads to greater Coriolis displacement, thus, higher detection efficiency of the sensor. Also, the sensor of this embodiment has minimal sensitivities to temperature and external stresses, because it employs only one anchor for suspending the movable structures.

The embodiments described above have anti-phase couplers that are all mounted to the sensing frame and move with the frame in sense-mode. However, rate sensors according to the present invention can also have anti-phase couplers mounted directly to the substrate.

Figure 9:
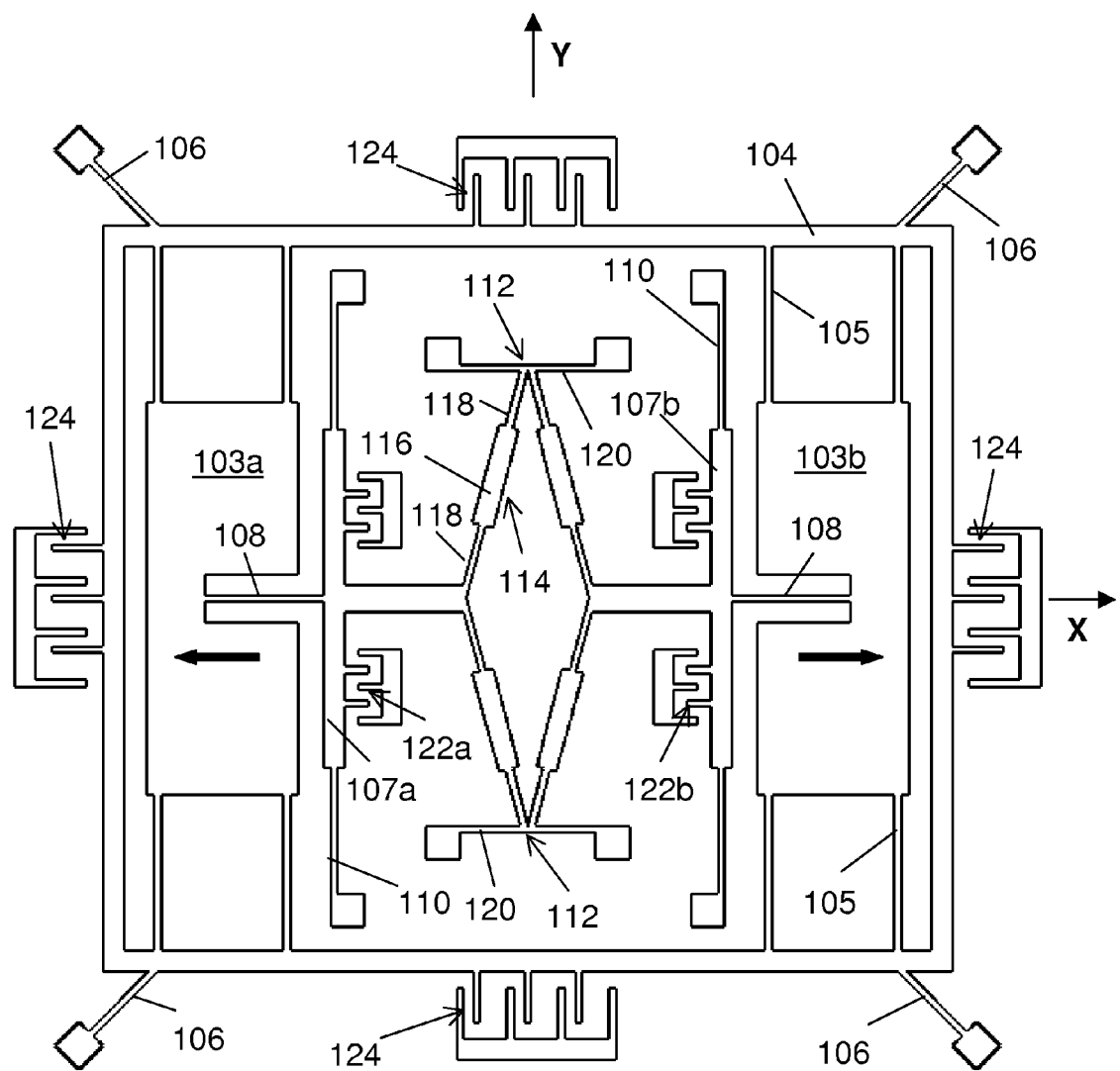
FIG. 9 is a top plan view of another embodiment of a z-axis rate sensor according to the present invention.

FIG. 9 illustrates another embodiment of a z-axis gyroscope that has anti-phase couplers mounted to the substrate. The rate sensor of this embodiment is symmetric about the x-, and y-axes. Two proof masses 103a, 103b disposed along the x-axis are suspended from a sensing frame 104 by flexures 105, which extend along the y-axis and constrain the masses for movement along the x-axis. Frame 104 is suspended by a set of flexures 106 and constrained for rotation about the z-axis.

Masses 103a, 103b are further connected respectively to driving frames 107a, 107b by flexures 108 which extend along the x-axis. The two driving frames are disposed side-by-side along the x-axis in the region between the two masses. The driving frames are suspended from the substrate by a set of flexures 110 for movement along the x-axis. Comb drives 122a, 122b are attached to the driving frames respectively for exciting the frames to oscillate along the x-axis in drive-mode.

The two driving frames are further coupled by a pair of anti-phase couplers 112, which are disposed spaced apart along the y-axis and symmetric about the x-axis, for anti-phase movement along the x-axis. Similar to anti-phase coupler 30 of the embodiment of FIG. 1, each anti-phase coupler 112 includes a pair of tilted link springs 114 and a supporting beam 120. Each link spring 114 consists of a stiff stem 116 and two hinge flexures 118. Each supporting beam 120 extends along the x-axis and is affixed to the substrate at its two ends.

In operation, frames 107a, 107b are driven by comb drives 122a, 122b respectively to oscillate in anti-phase manner along the x-axis in drive-mode. Flexures 108 transfer the movement of the driving frames to the masses. Since flexures 108 are stiff in longitudinal direction, masses 103a, 103b are rigidly linked to frames 107a, 107b respectively for movement along the x-axis, the phase of each mass is the same as that of the driving frame connected to it. Thus, the two masses are also oscillating in precise anti-phase manner along the x-axis. The rate of rotation about the z-axis produces Coriolis forces that cause the masses and the sensing frame to rotate about the z-axis. Since the masses move in lateral directions of flexures 108, these flexures impose little resistance to the sense-mode rotation. This rotation movement is sensed capacitively by the parallel-plate capacitors 124, which have interleaved plates attached to the sensing frame and to the anchors affixed to the substrate.

Unlike the embodiment of FIG. 5, the drive directions of the comb drives in this embodiment are parallel to the drive axis, i.e. the x-axis. And the driving frames serve as both the decoupled driver and part of anti-phase coupling means for the two masses. This is more efficient than that of the embodiment of FIG. 5, wherein the masses have additional anti-phase couplers 30 that directly couple the masses. However, this approach cannot be directly applied in y-axis gyroscope, because link flexures 108 resist the sense-mode rotation about the y-axis.

Figure 10:
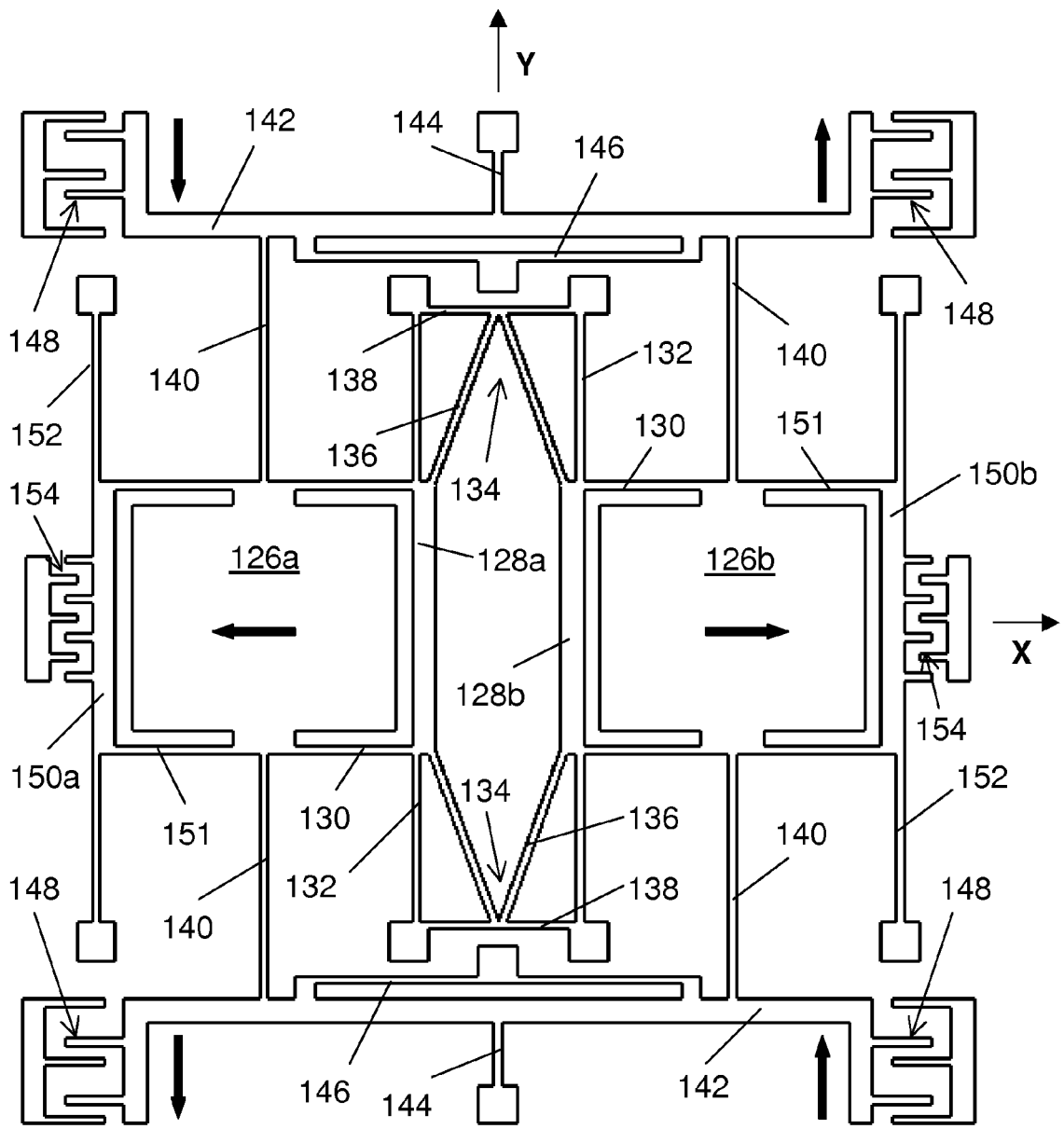
FIG. 10 is a top plan view of another embodiment of a z-axis rate sensor according to the present invention.

The rate sensors disclosed in the previous embodiments all have a single sensing frame for each sense-mode. FIG. 10 shows another embodiment of a z-axis rate sensor that has dual sensing frames for the sense-mode. In this embodiment, two masses 126a, 126b, which are disposed along the x-axis, are suspended from two driving frames 128a, 128b respectively by flexures 130 that extend along the x-axis. Flexures 130 link each mass to move together with its corresponding driving frame along the x-axis, while permit it to move relative to the frame along the y-axis, which is the sense axis of the mass.

Driving frames 128a, 128b are disposed side-by-side in a region between the two masses, and suspended by flexures 132 which extend along the y-axis and constrain the frames for movement along the x-axis. The two driving frames are coupled by a pair of anti-phase coupler 134, which are disposed along the y-axis and constrain the driving frames for anti-phase movement along the x-axis. Each anti-phase coupler 134 consists of a pair of tilted link springs 136 and a supporting beam 138 which extend along the x-axis and mounted to the substrate.

Each mass is connected to a pair of sensing frames 142 by flexures 140 which extend along the y-axis. The two sensing frames extending along the x-axis are disposed spaced apart along the y-axis. Each sensing frame is suspended by a flexure 144 which extends along the y-axis and are anchored to the substrate, and a flexure 146 that extend along the x-axis with its center affixed to the substrate. These two flexures constrain the sensing frame for rotation about an axis that is parallel to the z-axis and passes through the interception point of the extrapolating of the two flexures.

Masses 126a, 126b are further connected to two additional driving frames 150a, 150b respectively by flexures 151 extending along the x-axis. These frames are suspended from the substrate by flexures 152 extending along the y-axis. With these two additional frames, the masses can be well constrained for drive-mode movement along the x-axis with the driving frames, and sense-mode movement along the y-axis relative to the driving frames. And comb drives 154 attached to frames 150a, 150b can be used to drive the masses to oscillate in drive-mode or monitoring the velocity of the masses for drive loop control.

In operation, the masses are driven to oscillate in anti-phase manner along the x-axis. The Coriolis forces produced by the rate of rotation about the z-axis cause the masses to move in their sense directions parallel to the y-axis. This sense movement is transferred to two sensing frames 142 by flexures 140 to cause each sensing frame to rotate about its rotation axis parallel to the z-axis. The rotations of the two sensing frames are in-phase to one another. And this sense-mode rotation is monitored by parallel-plate capacitors 148 attached to the frames for measuring rate of rotation.

The use of dual rotation sensing frames in this embodiment reduces the inertia moment of inactive parts in the sense mode, in comparison to the single sensing frame used in the previous embodiments. Thus, it improves the detection efficiency of the rate sensor.

Figure 11:
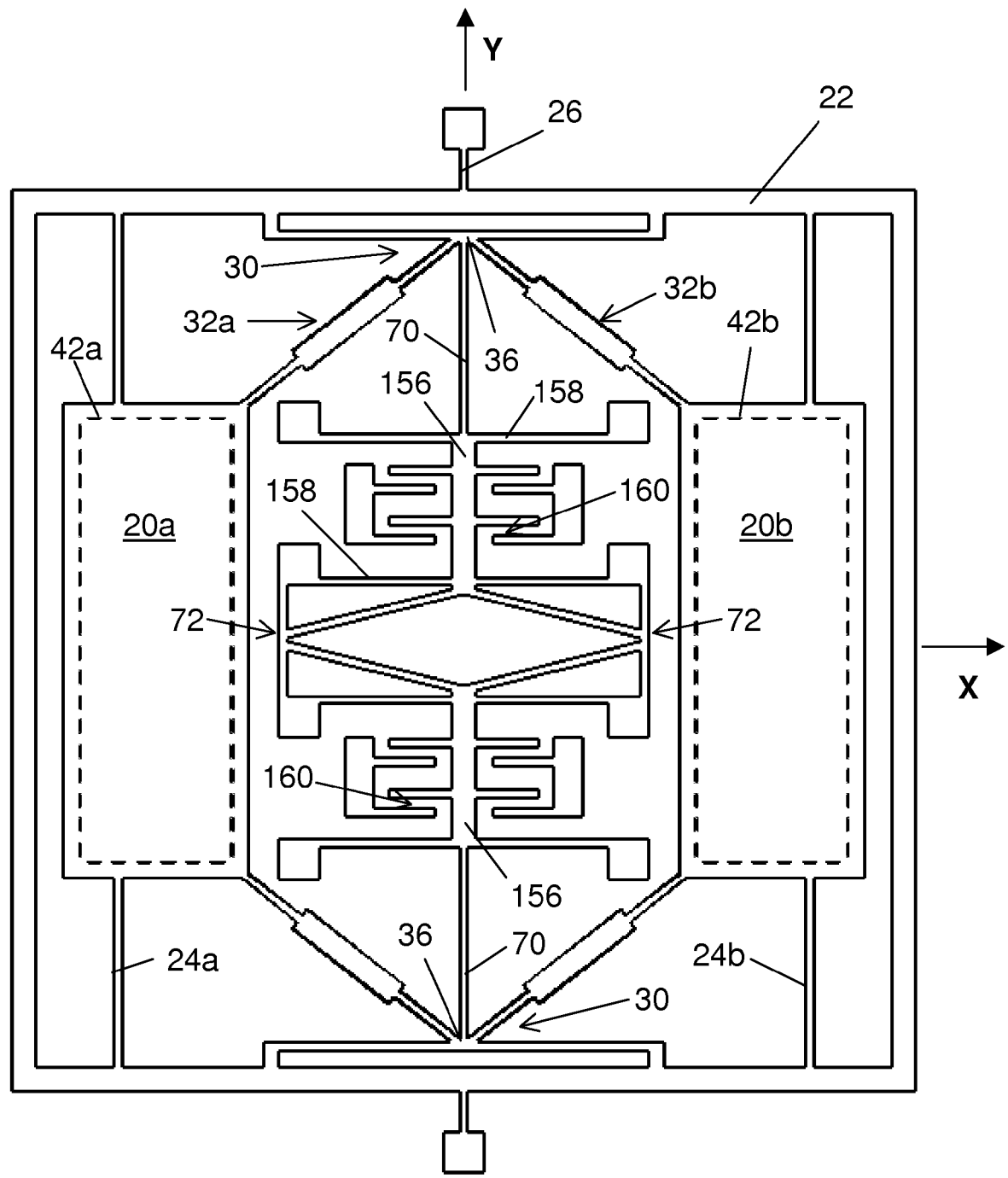
FIG. 11 is a top plan view of another embodiment of a y-axis rate sensor according to the present invention.

FIG. 11 shows another embodiment of a y-axis rate sensor which has similar structure as to the embodiment of FIG. 6, but has different operation mode with reversed drive and sense functionalities compared to that of FIG. 6. The drive signals are now applied to electrode plates 42a, 42b to drive the masses 20a, 20b and supporting frame 22, which serves as a driving frame now, to move out-of-plane and rotate about the y-axis. In presence of rate of rotation about the y-axis, Coriolis forces produced by this rotation and the velocities of the masses in z-axis cause the masses to move in anti-phase manner along the x-axis, which is now the sense axis of the masses. This movement is transferred to joints 36 by link springs 32a, 32b for movement along the y-axis. The movement of joints 36 is further transferred by link flexures 70 to a pair of sensing frames 156, which are spaced apart along the y-axis, which is a normal axis perpendicular to the sense axis.

The sense frames are constrained for movement primary along the y-axis by a set of flexures 158 which extend along the x-axis.

The two sensing frames are coupled by anti-phase couplers 72 to move in anti-phase manner along the y-axis, and to further suppress their in-phase movement. The anti-phase movement of the sensing frames is monitored for measuring rate of rotation about the y-axis by parallel-plate capacitors 160 which have interleaved plates attached to the sensing frames and connected to the anchors affixed to the substrate.

It can be seen, driving frames 64 of the embodiment of FIG. 6 are replaced by sensing frames 156, and drive combs 66 are replaced by parallel-plate capacitors 160 in this embodiment. The combination of anti-phase couplers 30 and 72 ensure the masses, as well as sensing frames to oscillate in anti-phase manners, so that the sense-mode is severely resistant to external linear acceleration along the x- and y-axes. This leads to superior performance of the sensor in vibration noise rejection.

It should be noted that, in this embodiment, the sense-mode motion of the sensing frames can be larger than that of the masses by adjusting the tilt angle of the link springs, which provides a mechanical amplifier for the sense mode. Amplified sensing frame displacement leads to larger capacitance output for same angular rate input, which results in higher sensitivity of the sensor.

Figure 12:
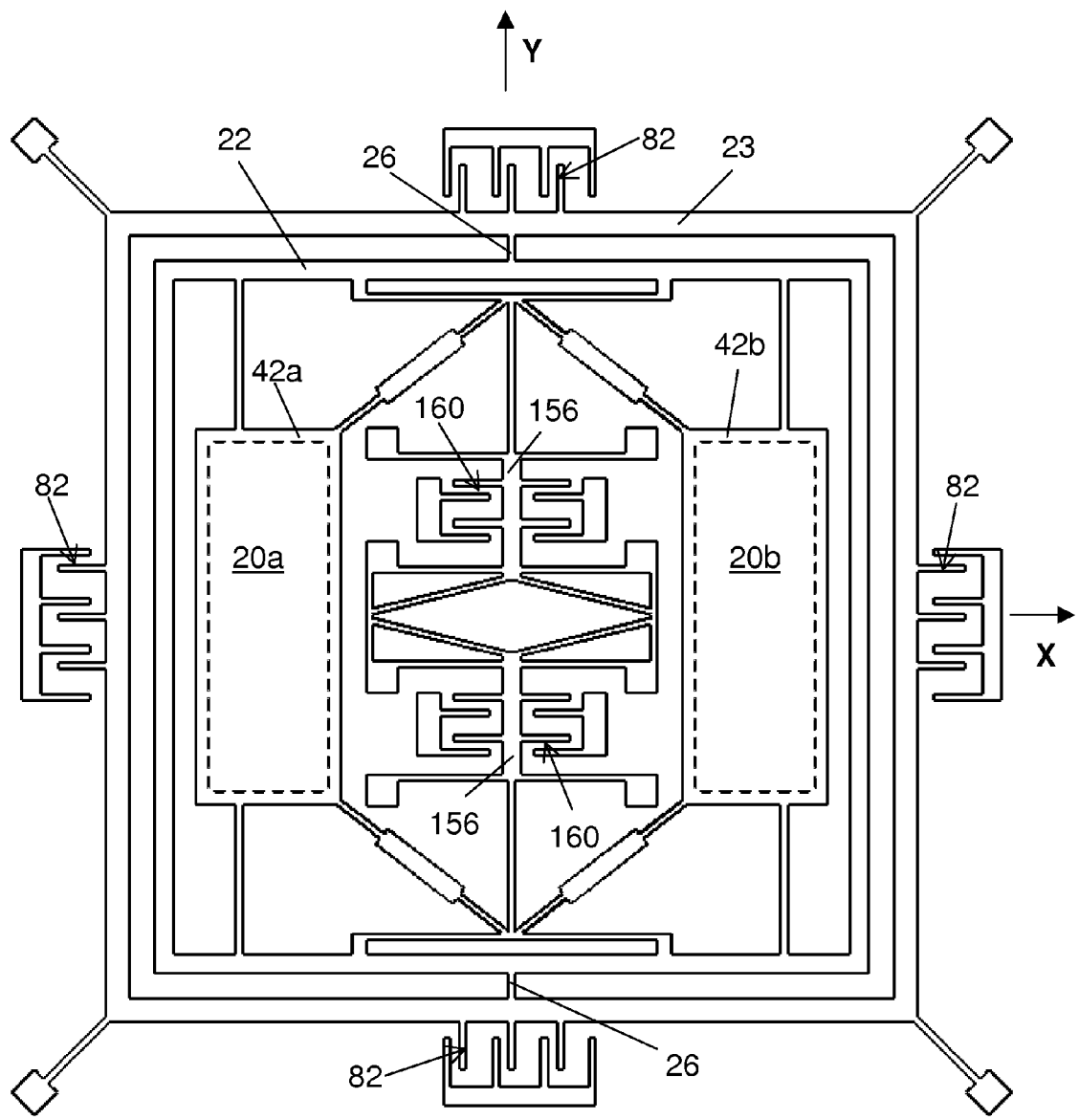
FIG. 12 is a top plan view of an embodiment of a dual-axis rate sensor according to the present invention for detecting rate of rotation about the x-, and y-axes.

Similar modifications can also be made to the embodiment of the dual-axis rate sensor illustrated in FIG. 7, so that it becomes a dual-axis gyroscope for measuring rate of rotation about the x-, and y-axes, as shown in FIG. 12. This embodiment of dual-axis rate sensor can be viewed as a y-axis rate sensor, as shown in FIG. 11, suspended by a pair of torsion springs 26 from sensing frame 23, which is mounted for rotation about the z-axis. Torsion springs 26 permit driving frame 22 to rotate about the y-axis relative to sensing frame 23 while severely resisting other relative movement between the two frames. Sensing frame 23 adds an additional rotation freedom to the device that enables the masses to rotate about the z-axis, in addition to the x-axis.

Again, masses 20a, 20b are driven electrostatically by the electrodes 42a, 42b respectively to rotate with frame 22 about the y-axis in drive-mode. The Coriolis forces produced by the velocities of the masses in the z-axis and rate of rotation about the y-axis cause the masses to move along the x-axis. The movements of the masses along the x-axis are linked and transferred to sensing frames 156 for oscillation along the y-axis in anti-phase manner. This sense-mode movement is monitored by capacitors 160 for measuring the rate of rotation about the y-axis. In the mean time, the Coriolis forces produced by the velocities of the masses in the z-axis and rate of rotation about the x-axis cause the masses and frames 22, 23 to rotate together about the z-axis. The sense-mode rotation of frame 23 is monitored by parallel-plate capacitors 82 for measuring rate of rotation about the x-axis.

Since the movements of the masses in the two sense modes are independent from one another, i.e. the two sense modes are decoupled, this dual-axis rate sensor can measure the two components (x-, and y-) of an angular velocity simultaneously with minimal interference or cross-talk.

Figure 13:
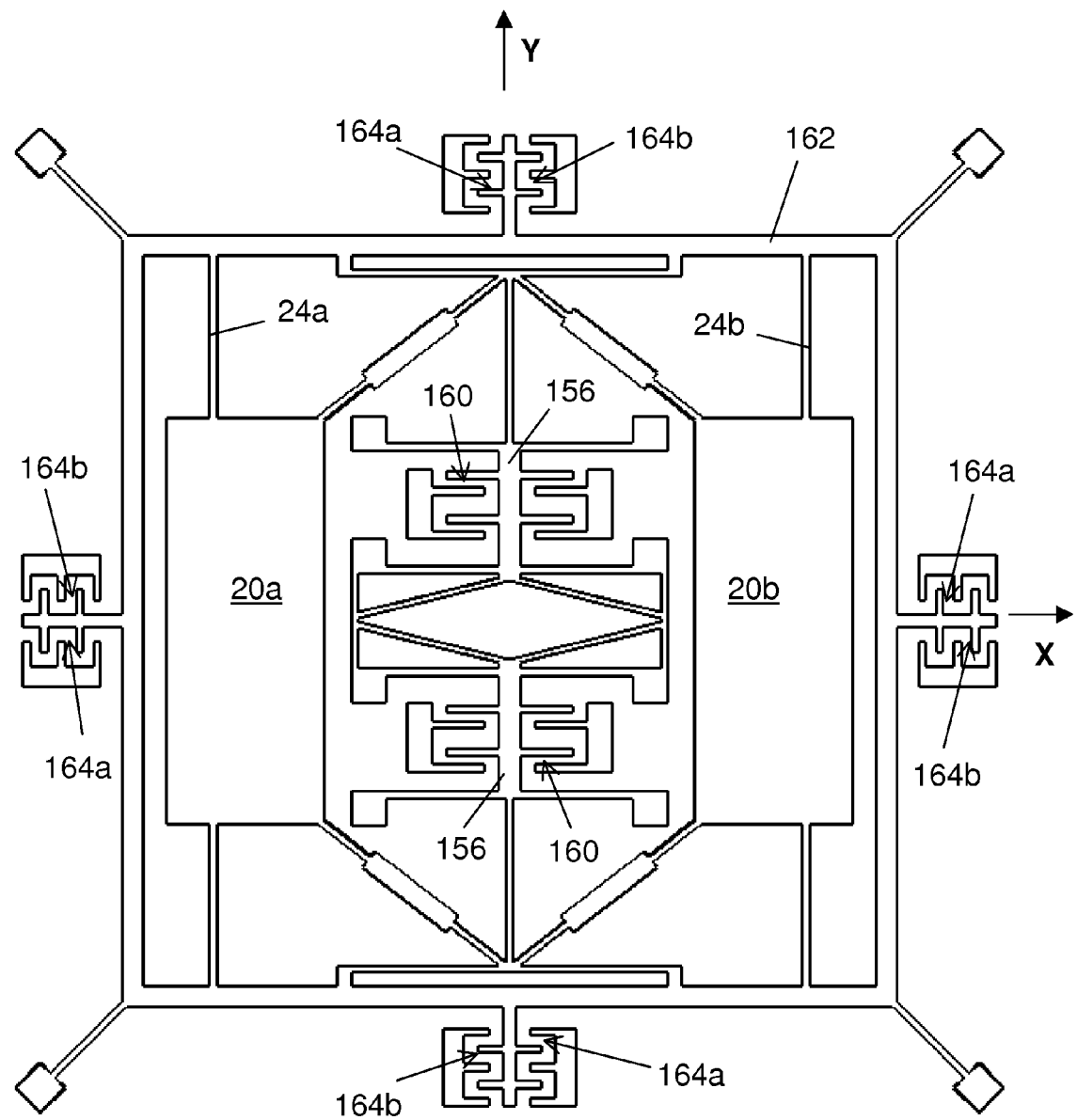
FIG. 13 is a top plan view of another embodiment of a z-axis rate sensor according to the present invention.

With similar modifications, the embodiment of FIG. 5 can also have another operation mode by switching the drive and sense functionalities. As shown in FIG. 13, a driving frame 162 suspended for rotation about the z-axis replaces sensing frame 22 of FIG. 5. Comb drivers 164a, 164b, which have movable fingers attached to the driving frame, are disposed along the circumference of the frame for driving the frame to rotate about the z-axis. Since comb drivers 164a and 164b in each pair are oriented in opposite directions, they can be used for differential drive, or one for drive and one for drive amplitude monitoring for the drive loop control.

Since flexures 24a, 24b, which suspend the masses from the driving frame, are stiff in longitudinal directions, the masses move together with the driving frame to rotate about the z-axis in drive-mode. In presence of rate of rotation about the z-axis, Coriolis forces produced by this rotation and the velocities of the masses along the y-axis cause the masses to move along their sense axis, i.e. the x-axis, in anti-phase manner. Similar to that in the embodiment of FIG. 11, the movement of the masses are linked and transferred to a pair of coupled sensing frames 156 for anti-phase movement along the y-axis. This movement is sensed by capacitors 160 for measuring the rate of rotation about the z-axis.

Figure 14:
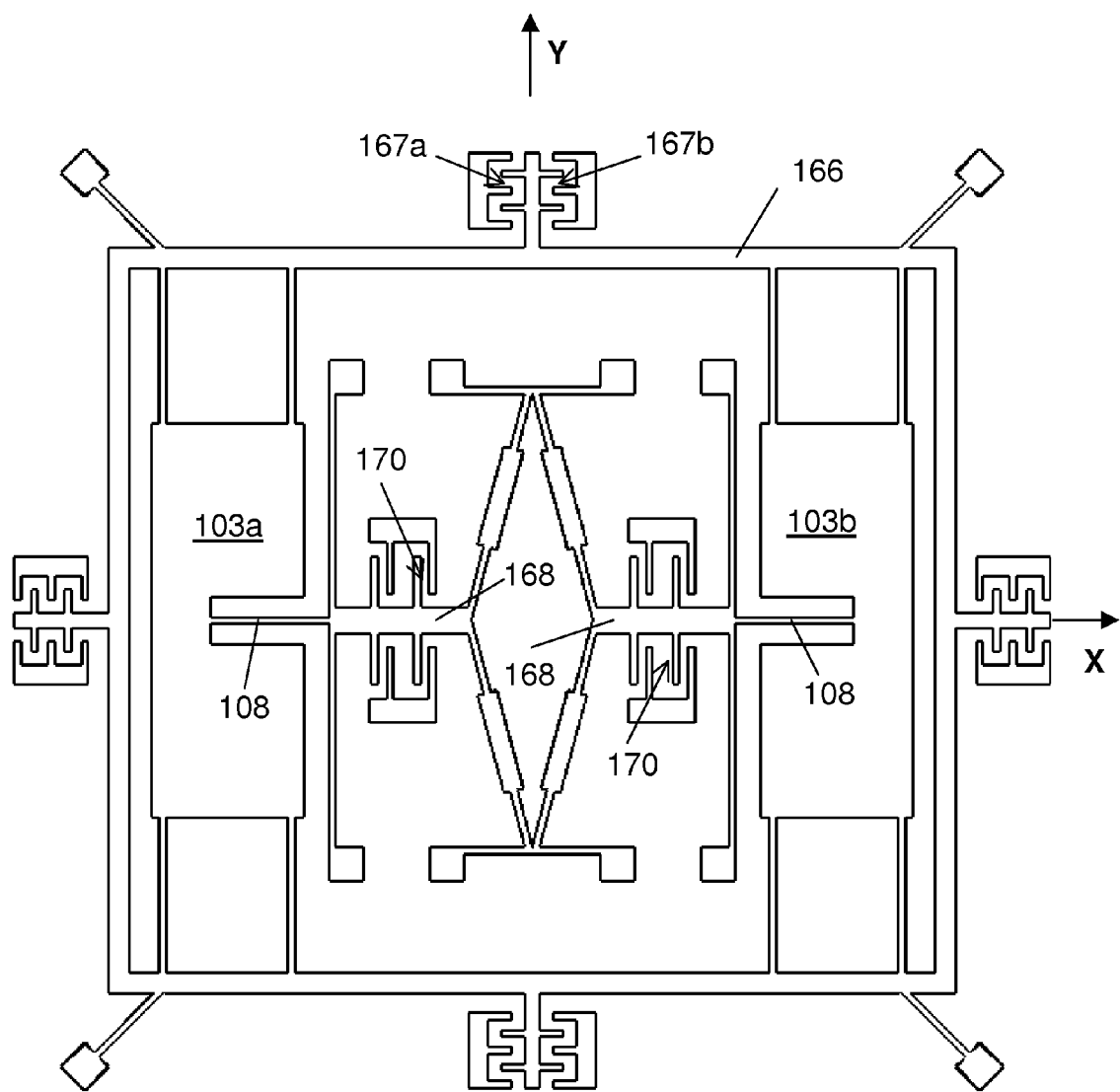
FIG. 14 is a top plan view of another embodiment of a z-axis rate sensor according to the present invention.

FIG. 14 shows another embodiment of a z-axis gyroscope that is modified from the embodiment of FIG. 9 with switched drive and sense functionalities. A driving frame 166 which is mounted for rotation about the z-axis and driven by comb drives 167a, 167b replaces sensing frame 104 in FIG. 9.

Similar to the embodiment of FIG. 13, masses 103a, 103b move with frame 166 for rotation about the z-axis in drive-mode. In presence of rate of rotation about the z-axis, Coriolis forces produced by this rotation and the velocities of the masses in the y-direction cause the masses to move along the x-axis in anti-phase manner. The movements of the masses are transferred by flexures 108 to a pair of sensing frames 168 which are constrained for anti-phase movement along the x-axis. This sense-mode movement of the sensing frames is monitored by the capacitors 170 for measuring rate of rotation about the z-axis.

Figure 15:
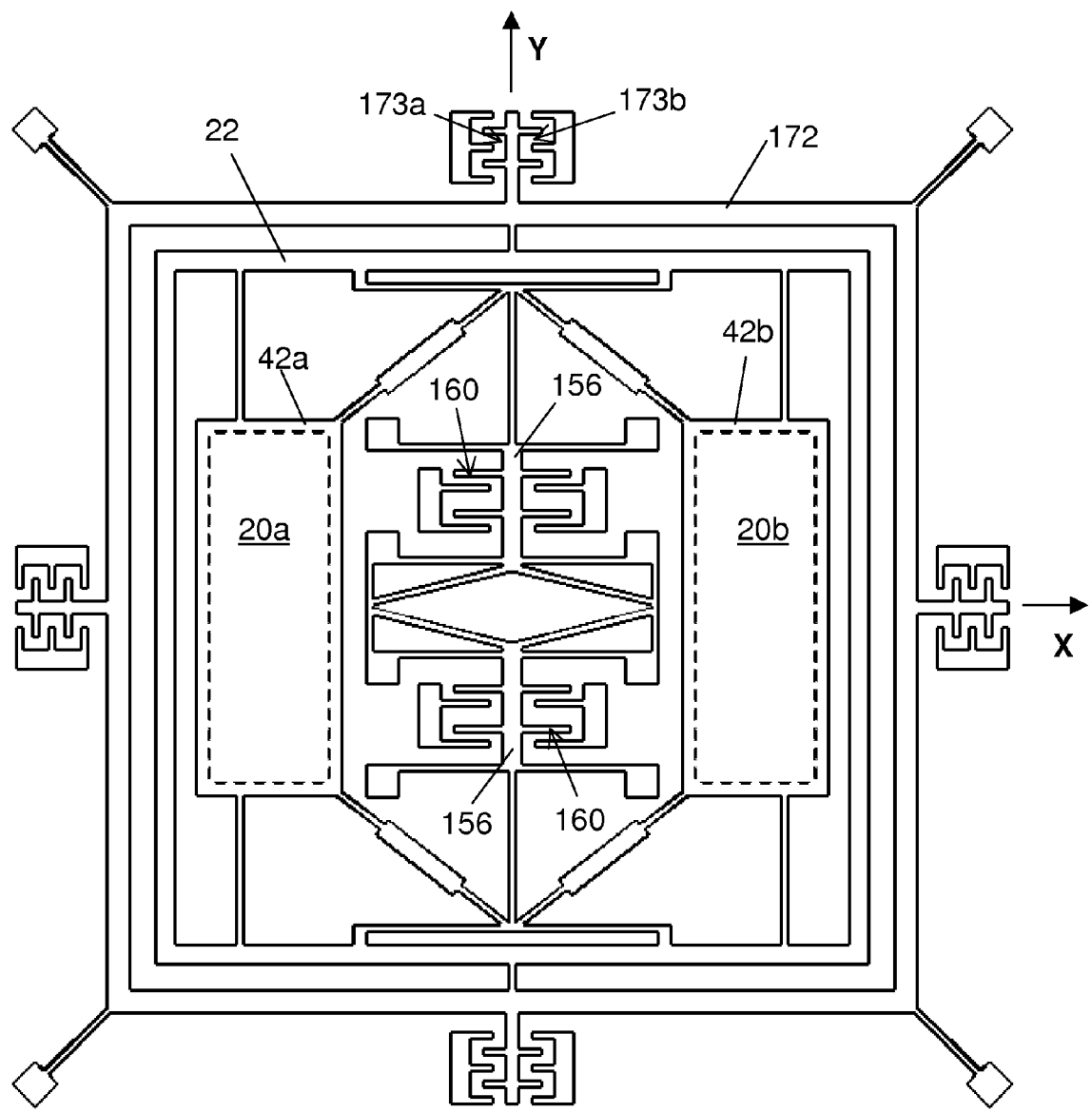
FIG. 15 is a top plan view of an embodiment of a dual-axis rate sensor according to the present invention for detecting rate of rotation about the x-, and z-axes.

The drive approach shown as in FIG. 13 and FIG. 14 can also be applied to the embodiment of dual-axis gyroscope of FIG. 12 so that it becomes a dual-axis gyroscope for measuring the rate of rotation about the x-, and z-axes, as shown in FIG. 15. A driving frame 172 in this embodiment replaces sensing frame 23 of FIG. 12. The driving frame is driven by comb drives 173a, 173b to rotate with supporting frame 22 and masses 20a, 20b about the z-axis in drive-mode.

In presence of rate of rotation about the x-axis, Coriolis forces produced by this rotation and the velocities of the masses along the y-axis cause the masses and frame 22 to rotate about the y-axis. This sense-mode movement is detected capacitively by electrode plates 42a, 42b which are placed underneath the masses for measuring rate of rotation about the x-axis.

In presence of angular rate input about the z-axis, Coriolis forces produced by that rotation and the velocities of the masses along the y-axis cause the masses to move along the x-axis in anti-phase manner. This movement is transferred to sensing frames 156 for anti-phase movement along the y-axis. This sense-mode movement of the sensing frames is monitored by parallel-plate capacitors 160 for measuring rate of rotation about the z-axis.

Figure 16:
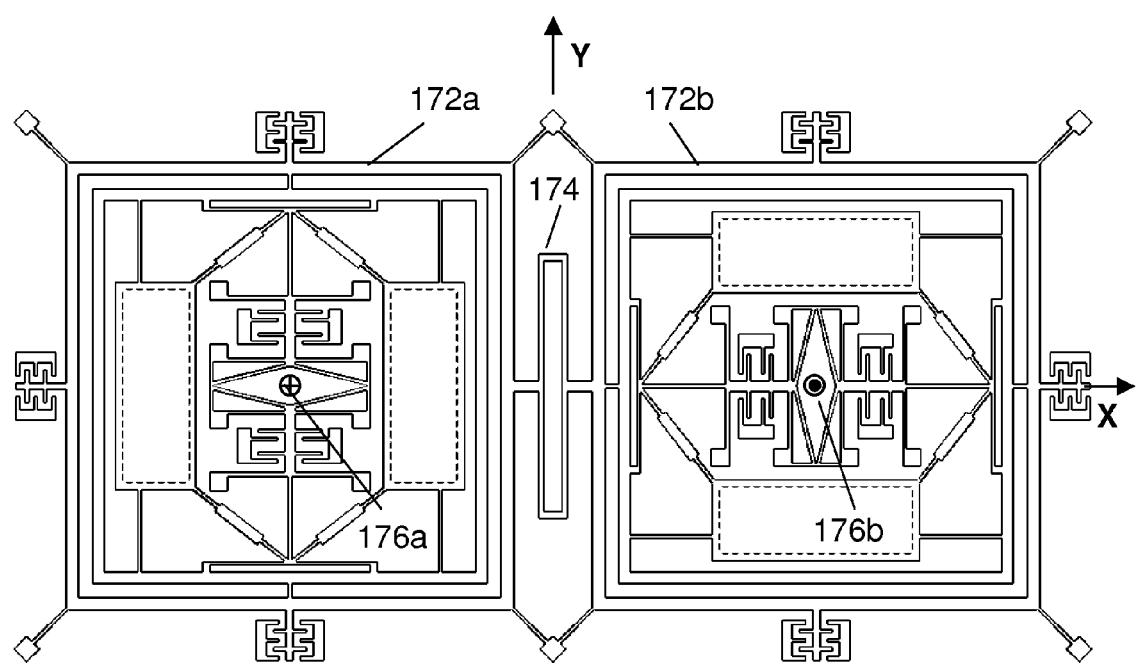
FIG. 16 is a top plan view of an embodiment of a tri-axis rate sensor according to the present invention for detecting rate of rotation about the x-, y-, and z-axes.

FIG. 16 shows an embodiment of a tri-axis gyroscope for measuring rate of rotations about the x-, y-, and z-axes. It employs two sub-sensors, each of which is a dual-axis rate sensor as shown in FIG. 15. The two sub-sensors are disposed side-by-side along the x-axis with the right one rotated 90 degrees about the z-axis from the left one. The left sub-sensor measures rate of rotation about the x-, and z-axes, and the right sub-sensor measures rate of rotation about the y-, and z-axes.

The two sub-sensors can be further coupled together by a coupling spring 174, which connect the midpoints of the adjacent edges of driving frames 172a, 172b of the two sub-sensors. The coupling spring is in the form of a small rectangular frame, with relative long, flexible flexures extending in the y-direction and relatively short, stiff ones in the x-direction. This spring constrains frames 172a, 172b to rotate in anti-phase manner about their drive axes 176a, 176b, which locate at the centers of the frames respectively and extend parallel to the z-axis.

The structures of the two sub-sensors can be identical, so that their oscillations about the drive axes in drive-mode are equal in amplitude and precisely anti-phase to one another. Therefore, the net angular drive momentum is zero and the device does not inject vibration energy into the substrate.

Since the overall tri-axis rate sensor has a single resonant mode that is excited as drive-mode, a single drive loop is sufficient to achieve amplitude-controlled drive-mode oscillation of all masses in the sensor. It simplifies the circuitry of the device and lowers cost.

The tri-axis rate sensor of this embodiment includes two rate sensors for measuring rate of rotation about the z-axis. That could be advantageous for some applications, such as stability controlling for automobile, which is desirable to have a redundant YAW rate sensor.

Figure 17:
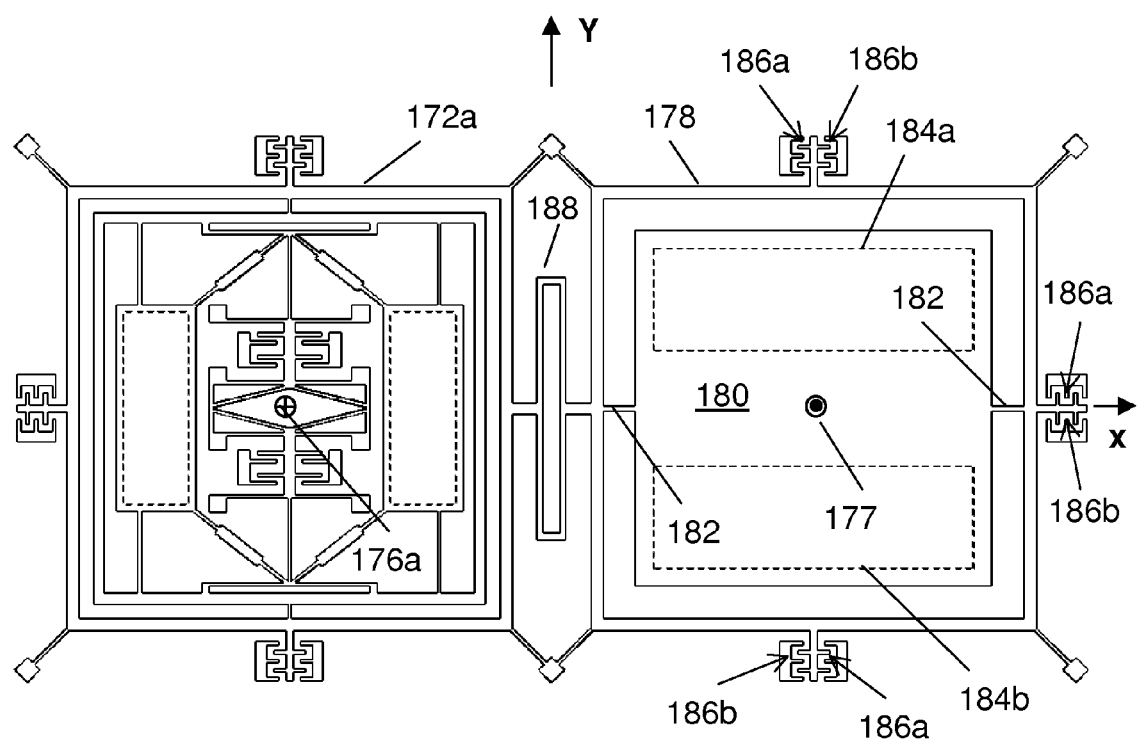
FIG. 17 is a top plan view of another embodiment of a tri-axis rate sensor according to the present invention for detecting rate of rotation about the x-, y-, and z-axes.

FIG. 17 illustrates another embodiment of a tri-axis rate sensor which employs two subsensors without redundant sensors about the z-axis. The left subsensor is similar to that of the previous embodiment for measuring rate of rotation about the x-, and z-axes. However, the right subsensor is simplified to a single axis rate sensor for measuring rate of rotation about the y-axis only.

The right subsensor includes a driving frame 178 mounted for rotation about a rotation axis, or driving axis, 177, which is parallel to the z-axis. Mass 180 is disposed within the driving frame and suspended from it by a pair of torsion springs 182, which are spared apart and extend along the x-axis. The torsion springs permit the mass to rotate about the x-axis and severely resist other relative movements between the mass and the driving frame.

In operation, driving frame 178 and mass 180 are excited to rotate about driving axis 177 in drive-mode by comb drives 186a, 186b, which have moving comb fingers attached to driving frame 178 and stationary fingers connected to anchored electrodes. Coriolis forces produced by rate of rotation about the y-axis cause the mass to rotate about the x-axis. This sense-mode rotation movement is detected capacitively by electrode plates 184a, 184b, which are disposed underneath the mass and spaced apart along the y-axis, for monitoring rate of rotation about the y-axis.

Similar to the embodiment of FIG. 16, the two subsensors can be further coupled together to have a common drive-mode by a coupling spring 188, which is similar to 174 in the previous embodiment and are connected to the midpoints of adjacent edges of driving frames 172a and 178.

The rate sensors according the present invention can be made from a material such as single-crystal silicon, polycrystalline silicon, metal, or other conductive materials, or insulate materials coated with conductive films, on a substrate such as silicon, glass, or other materials, by suitable MEMS process such as deep-reactive-ion-etching. And the sensor may be operated in atmosphere ambient or in vacuum housing for better performances.

It is apparent from the foregoing that a new and improved angular rate sensor has been provided. While only presently preferred embodiments have been described in detail, as will be apparent to those familiar with the art, certain changes and modifications can be made without departing from the scope of the invention as defined by the following claims.

The invention claimed is:

1. An angular rate sensor comprising:
   first and second generally planar masses disposed along a first axis in the plane of the masses;
   a supporting frame in the plane of the masses and mounted for torsional movement about a second axis which is perpendicular to the first axis;
   flexures suspending the masses from the frame and constraining the masses for linear movement along the first axis relative to the frame;
   a pair of anti-phase couplers suspended from the frame and connected to the masses for constraining the masses for anti-phase linear movement along the first axis, wherein said couplers are spaced apart in a direction substantially perpendicular to the first axis, and each coupler comprising:
      a supporting beam which extends in a direction substantially parallel to the first axis and is mounted to the frame at its two ends;
      first and second link springs which extend from the first and second masses respectively to the beam and join one another to form a common joint at substantially the midpoint of the supporting beam;
   actuation means for driving the masses to oscillate along or about a preselected drive axis in drive-mode;
   detection means responsive to the sense-mode movement of the frame and/or the masses in response to Coriolis forces produced by the rotation of the masses about a predetermined input axis which is perpendicular to the velocities of the masses in drive-mode for monitoring rate of rotation about the input axis.

2. The rate sensor of claim 1 wherein each said link spring is a straight beam.

3. The rate sensor of claim 1 wherein each said link spring comprising:
   a substantially stiff stem;
   first and second hinges connected to the two ends of said stem respectively, wherein said hinges are flexible beams permitting bending in the plane.

4. The rate sensor of claim 1 wherein the link springs are tilted from a direction perpendicular to the first axis at a predetermined angle.

5. The rate sensor of claim 1 further comprising a pair of subassemblies disposed in the plane of the masses and spaced apart along an operating axis which is parallel to the plane and perpendicular to the first axis, wherein each said subassembly comprises:
   a sub frame disposed and constrained for movement along said operating axis;
   a flexure extending substantially along said operating axis and connecting the sub frame to adjacent joint of the link springs, wherein said flexure is substantially stiff along said operating axis, but flexible for bending along the first axis and for rotation about said operating axis.

6. The rate sensor of claim 5 further comprising another pair of anti-phase couplers connected between the sub frames of said subassemblies for constraining the sub frames for anti-phase linear movement along said operating axis.

7. The rate sensor of claim 5 further comprising at least one comb drive with movable comb fingers attached to one of the sub frames of the subassemblies for driving the masses to oscillate along the first axis in drive-mode.

8. The rate sensor of claim 5 further comprising at least one capacitor with movable plates attached to one of the sub frames of the subassemblies for monitoring the linear movement of the masses along the first axis in sense-mode.

* * * * *